US012384638B2

(12) United States Patent
Miyazawa et al.

(10) Patent No.: US 12,384,638 B2
(45) Date of Patent: Aug. 12, 2025

(54) POST PROCESSING DEVICE, RECORDING SYSTEM, AND METHOD FOR CONTROLLING POST PROCESSING DEVICE

(71) Applicant: SEIKO EPSON CORPORATION, Tokyo (JP)

(72) Inventors: Masaki Miyazawa, Matsumoto (JP); Takeru Oguchi, Chino (JP)

(73) Assignee: Seiko Epson Corporation, Tokyo (JP)

( * ) Notice: Subject to any disclaimer, the term of this patent is extended or adjusted under 35 U.S.C. 154(b) by 184 days.

(21) Appl. No.: 18/178,696

(22) Filed: Mar. 6, 2023

(65) Prior Publication Data

US 2023/0278821 A1 Sep. 7, 2023

(30) Foreign Application Priority Data

Mar. 7, 2022 (JP) ................................ 2022-034186

(51) Int. Cl.
*B65H 29/24* (2006.01)
*B41J 11/00* (2006.01)
(Continued)

(52) U.S. Cl.
CPC .......... *B65H 9/108* (2013.01); *B41J 11/0005* (2013.01); *B65H 43/00* (2013.01);
(Continued)

(58) Field of Classification Search
CPC ...... B41J 11/0005; B65H 9/108; B65H 29/24; B65H 29/245; B65H 29/247; B65H 43/00; B65H 2301/51256; B65H 2301/4461; B65H 2406/10; B65H 2406/12; B65H 2406/365; B65H 2511/15; B65H 2701/1313
(Continued)

(56) References Cited

U.S. PATENT DOCUMENTS 6,145,825 A * 11/2000 Kunihiro .................. B42C 1/12 271/181
6,889,971 B2 * 5/2005 Tamura ............. B65H 31/3027 270/58.11

(Continued)

FOREIGN PATENT DOCUMENTS

JP 2014-047047 A 3/2014
JP 2014-065609 A 4/2014

*Primary Examiner* — Leslie A Nicholson, III
(74) *Attorney, Agent, or Firm* — WORKMAN NYDEGGER

(57) ABSTRACT

A post processing device includes: a processing tray that supports media on which post processing is performed; a post processing section configured to perform post processing on the medium supported by the processing tray; and a blowing section configured to blow air at the medium supported by the processing tray, wherein a control section for controlling the blowing section sets a blowing amount by the blowing section to a first blowing amount when the number of sheets of medium supported by the processing tray is less than a predetermined set number of sheets and sets a blowing amount by the blowing section to a second blowing amount, which is larger than the first blowing amount, when the number of sheets of medium supported by the processing tray is equal to or greater than the set number of sheets.

18 Claims, 8 Drawing Sheets

(51) Int. Cl.
*B65H 9/10* (2006.01)
*B65H 43/00* (2006.01)

(52) U.S. Cl.
CPC .............. *B65H 2301/51256* (2013.01); *B65H 2406/10* (2013.01); *B65H 2511/15* (2013.01); *B65H 2701/1313* (2013.01)

(58) Field of Classification Search
USPC ............................................ 270/58.07, 58.09
See application file for complete search history.

(56) References Cited

U.S. PATENT DOCUMENTS

| | | | | |
|---|---|---|---|---|
| 8,915,492 | B2 * | 12/2014 | Sugiyama | B42C 1/12<br>271/220 |
| 10,289,050 | B2 * | 5/2019 | Shibasaki | B65H 31/02 |
| 10,894,684 | B2 * | 1/2021 | Okada | G03G 15/6573 |
| 11,274,008 | B2 * | 3/2022 | Okada | B65H 43/00 |
| 2014/0062003 | A1 | 3/2014 | Niitsuma et al. | |
| 2014/0062016 | A1 | 3/2014 | Watanabe et al. | |

* cited by examiner

POST PROCESSING DEVICE, RECORDING SYSTEM, AND METHOD FOR CONTROLLING POST PROCESSING DEVICE

The present application is based on, and claims priority from JP Application Serial Number 2022-034186, filed Mar. 7, 2022, the disclosure of which is hereby incorporated by reference herein in its entirety.

BACKGROUND

1. Technical Field

The present disclosure relates to a post processing device for processing medium and a recording system provided with a post processing device. The present disclosure also relates to a method for controlling a post processing device.

2. Related Art

A post processing device for performing post processing such as stapling processing and punching processing on a medium such as sheets has been known, and one example thereof is shown in JP-A-2014-65609.

An image forming system described in JP-A-2014-65609 is provided with a staple paper sheet discharge roller for discharging sheets of paper, an end face binding processing tray on which sheets of paper discharged by the staple sheet discharge roller are stacked, and a first blowing device for blowing air at the sheets of paper. By the first blowing device, an air layer is formed on the lower surface side of a sheet of paper to be discharged, so that adhesion or sticking between the sheet of paper and the end face binding processing tray, and adhesion or sticking between sheets of paper that are discharged in succession, can be prevented and alignment can be performed in that state.

A blowing amount blown from the first blowing device is changed according to paper information. For example, processing is performed such that in the case of coated paper in which sticking occurs easily, air is blown, and in the case of a plain paper in which sticking does not occur easily, air is not blown.

When air is blown at sheets in a state where the number of sheets on the end face binding processing tray is small, then the sheets may be deformed or alignment of the sheets may be adversely affected.

SUMMARY

In order to overcome the above-described problem, a post processing device according to the present disclosure is a post processing device that performs post processing on medium recorded by a recording device, the post processing device including a processing tray configured to support a medium on which post processing is to be performed; a post processing section configured to perform post processing on the medium supported by the processing tray; and a blowing section configured to blow air at the medium supported by the processing tray, wherein: a control section for controlling the blowing section sets a blowing amount by the blowing section to a first blowing amount when the number of sheets of medium supported by the processing tray is less than a predetermined set number of sheets and sets a blowing amount by the blowing section to a second blowing amount, which is larger than the first blowing amount, when the number of sheets of medium supported by the processing tray is equal to or greater than the set number of sheets.

A recording system of the present disclosure is a recording system including a recording device including a recording section for recording on a medium and the post processing device that performs post processing on medium recorded by the recording device.

Also, a method of the present disclosure for controlling a post processing device, wherein the processing device includes a processing tray configured to support a medium on which post processing is to be performed; a post processing section configured to perform post processing on the medium supported by the processing tray; and a blowing section configured to blow air at the medium supported by the processing tray, is a method including setting a blowing amount blown by the blowing section to a first blowing amount when a number of sheets of medium supported by the processing tray is less than a predetermined set number of sheets and setting a blowing amount by the blowing section to a second blowing amount, which is larger than the first blowing amount, when the number of sheets of medium supported by the processing tray is equal to or greater than the set number of sheets.

DESCRIPTION OF EMBODIMENTS

Figure 1:
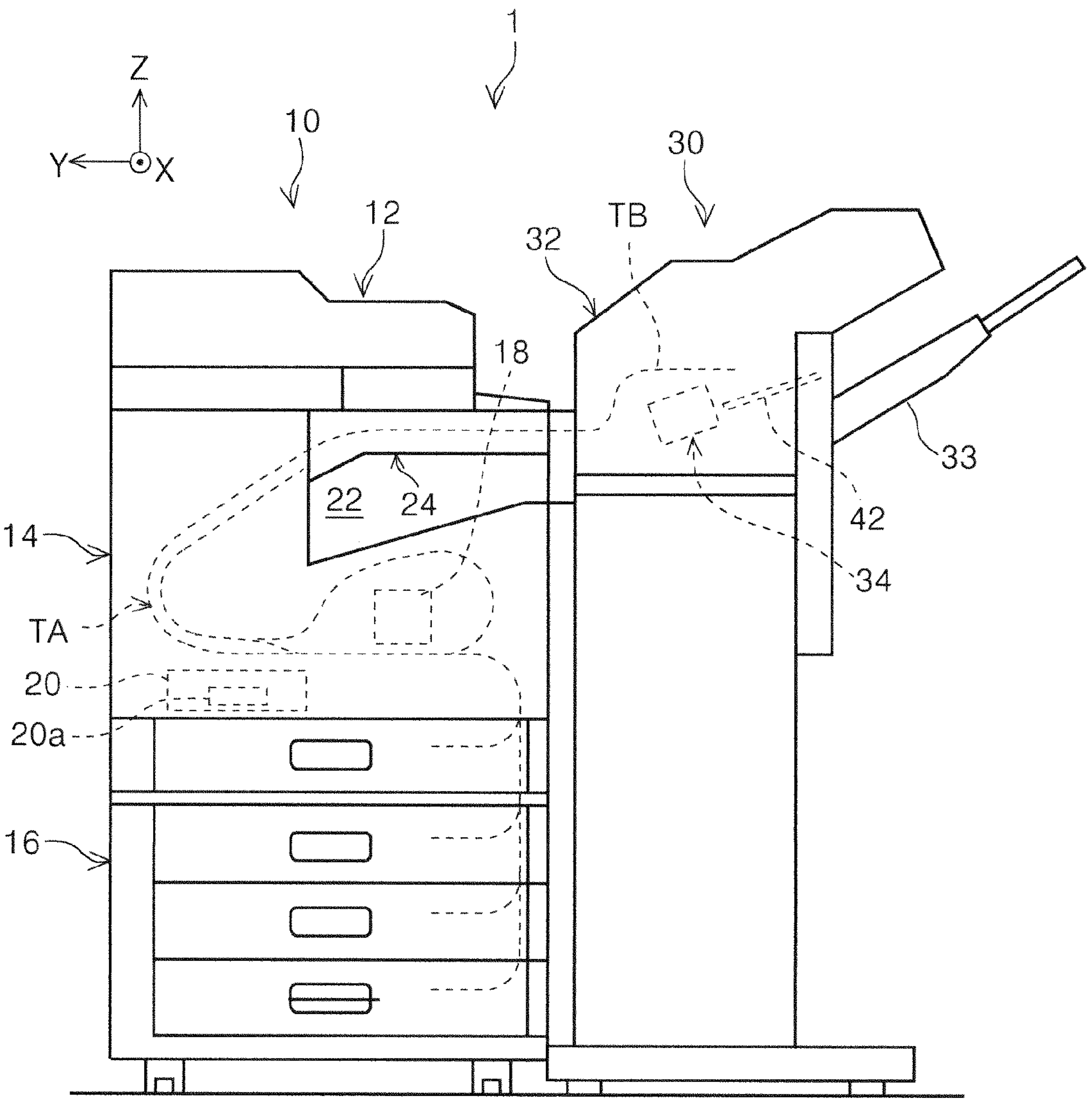
FIG. 1 is a front view of a recording system.

The following is a description of the disclosure in general terms.

A post processing device according to a first aspect is a post processing device that performs post processing on medium recorded by a recording device, the post processing device including a processing tray configured to support a medium on which post processing is to be performed; a post processing section configured to perform post processing on the medium supported by the processing tray; and a blowing section configured to blow air at the medium supported by the processing tray, wherein: a control section for controlling the blowing section sets a blowing amount by the blowing section to a first blowing amount when the number of sheets of medium supported by the processing tray is less than a predetermined set number of sheets and sets a blowing amount by the blowing section to a second blowing amount, which is larger than the first blowing amount, when the number of sheets of medium supported by the processing tray is equal to or greater than the set number of sheets.

On the one hand, air blown by the blowing section basically enhances alignment of the medium on the processing tray, but on the other hand, if the number of sheets of medium supported by the processing tray is less than the set number of sheets, then the blown air may deform the medium or may adversely affect the alignment of the medium. In the following, this will be referred to as an adverse effect caused by blowing air. However, according to this aspect, when the number of sheets of medium supported by the processing tray is less than the set number of sheets, the blowing amount by the blowing section is the first blowing amount, and the first blowing amount is smaller than the second blowing amount, so that the adverse effects caused by blowing can be suppressed.

When the number of sheets of medium supported by the processing tray is equal to or larger than the set number of sheets, the operation effect of blowing by the blowing section, for example, the effect of improving the alignment of medium on the processing tray, can be obtained.

In this specification, the first blowing amount includes also zero as a meaning of no air flow.

A second aspect is an aspect according to the first aspect, wherein the medium supported by the processing tray has a first region supported by the processing tray and a second region not supported by the processing tray and the blowing section blows air toward the second region.

In a configuration in which air is blown toward the second region which is not supported by the processing tray in medium, the adverse effect due to the blowing is likely to occur due to the blowing to the second region, but the adverse effect caused by blowing can be suppressed by a action of the first aspect.

A third aspect is an aspect according to the first or to the second aspect, wherein the first blowing amount is zero.

According to this aspect, since the first blowing amount is zero, the adverse effect caused by blowing can be more reliably suppressed.

A fourth aspect is an aspect according to any one of the first to third aspects, wherein the blowing section blows air from above with respect to the medium supported by the processing tray.

According to this aspect, since the blowing section blows air from above the medium supported by the processing tray, the medium supported by the processing tray can be prevented from curling upward.

A fifth aspect is an aspect according to the fourth aspect, wherein the blowing section blows air from above to vertically downward with respect to the medium supported by the processing tray.

According to this aspect, since the blowing section blows air from above to vertically downward with respect to the medium supported by the processing tray, it is possible to effectively suppress upward curl of the medium supported by the processing tray.

A sixth aspect is an aspect according to the second aspect, wherein the blowing section blows air from below the processing tray with respect to the second region of the medium supported by the processing tray.

Since the second region of the medium is not supported by the processing tray, the second region of medium tends to curl downward. However, according to this aspect, since the blowing section blows air from below the processing tray to the second region of the medium supported by the processing tray, it is possible to suppress curling in the downward of medium.

A seventh aspect is an aspect according to the second aspect, wherein a plurality of the blowing sections are provided and the plurality of blowing sections includes a first blowing section that blows air from above with respect to the medium supported by the processing tray and a second blowing section that blows air from below the processing tray with respect to the second region of the medium supported by the processing tray.

According to this aspect, since a first blowing section for blowing air from above to the medium supported by the processing tray and second blowing section for blowing air from below the processing tray to the second region of the medium supported by the processing tray are provided, it is possible to suppress both upward and downward curling of the medium.

A eighth aspect is an aspect according to any one of the first to third aspects or to any one of the fifth to seventh aspects, further including a transport section for feeding, to the processing tray, the medium on which post processing is to be performed; a pullback section that pulls the medium that was fed to the processing tray by the transport section, back in a direction opposite to a feed direction of the medium toward the processing tray; and a rear end alignment section that aligns a trailing edge of the medium that was pulled back by the pullback section, wherein a blowing direction of the blowing section includes a component along the feed direction.

According to this aspect, curling of the medium can be suppressed by blowing air containing a component along the feed direction of the medium to the processing tray.

A ninth aspect is an aspect according to any one of the first to eighth aspects, wherein the control section is configured to select a first mode for blowing air at the medium by the first blowing amount or by the second blowing amount based on a number of sheets of medium supported by the processing tray or a second mode in which the blowing amount by the blowing section does not change regardless of the number of sheets of medium supported by the processing tray.

According to this aspect, by selecting the first mode, it is possible to suppress the adverse effect caused by blowing, and by selecting the second mode, it is possible to give priority to an effect caused by blowing.

A tenth aspect is an aspect according to the ninth aspect, wherein the control section selects the first mode or the second mode based on medium information.

According to this aspect, since the control section selects the first mode or the second mode based on medium information, appropriate post processing based on a medium type can be performed.

An eleventh aspect is an aspect according to any one of the first to eighth aspects, wherein the control section is configured to select a blowing execution mode for blowing air at medium by the first blowing amount or the second blowing amount based on a number of sheets of medium supported by the processing tray and a blowing stop mode in which blowing by the blowing section is not executed regardless of the number of sheets of medium supported by the processing tray.

According to this aspect, by selecting the blowing execution mode, it is possible to obtain the effect of the blowing, and by selecting the blowing stop mode, it is possible to give priority to the suppression of power consumption, and to the suppression of an adverse effect caused by blowing, over the effect of blowing air.

A twelfth aspect is an aspect according to the eleventh aspect, wherein the control section selects the blowing execution mode or the blowing stop mode based on medium information.

According to this aspect, since the control section selects the blowing execution mode or the blowing stop mode based on medium information, appropriate post processing based on the medium type can be performed.

A thirteenth aspect is an aspect according to any one of the first to twelfth aspects, wherein a plurality of blowing sections are provided in a width direction, which is a direction intersecting a feed direction of the medium to the processing tray.

According to this aspect, since a plurality of the blowing sections are provided in the width direction, which is the direction intersecting with the feed direction of the medium to the processing tray, the effect of the air blowing can be more reliably obtained.

A recording system according to a fourteenth aspect of the present disclosure includes a recording device including a recording section for recording on a medium and a post processing device according to any one of the first to thirteenth aspects, the post processing device performing post processing on the medium recorded by the recording device.

According to this aspect, in the recording system, the operational effects of any one of the first to thirteenth aspects can be obtained.

A control method for a post processing device according to a fifteenth aspect is a control method for a post processing device including a processing tray configured to support a medium on which post processing is to be performed; a post processing section configured to perform post processing on the medium supported by the processing tray; and a blowing section configured to blow air at the medium supported by the processing tray, the method including setting a blowing amount blown by the blowing section to a first blowing amount when a number of sheets of medium supported by the processing tray is less than a predetermined set number of sheets and setting a blowing amount by the blowing section to a second blowing amount, which is larger than the first blowing amount, when the number of sheets of medium supported by the processing tray is equal to or greater than the set number of sheets.

According to this aspect, when the number of sheets of medium supported by the processing tray is less than the set number of sheets, the blowing amount by the blowing section is the first blowing amount, and because the first blowing amount being smaller than the second blowing amount, the adverse effect caused by blowing air can be suppressed.

When the number of sheets of medium supported by the processing tray is equal to or larger than the set number of sheets, the operation effect of blowing by the blowing section, for example, the effect of improving the alignment of medium on the processing tray, can be obtained.

Hereinafter, the present disclosure will be described in concrete terms.

A recording system 1 and a post processing device 30 according to a first embodiment of the present disclosure will be described below. In the drawings, an X-axis direction is the apparatus depth direction of the recording system 1. In the X-axis direction, the +X direction, which is the direction in which the arrow points, is a direction from a back surface of the apparatus to a front surface of the apparatus, and the −X direction is a direction from the front surface of the apparatus to the back surface of the apparatus. The X-axis direction is an example of a width direction of the medium. A Y-axis direction is the apparatus width direction of the recording system 1, and of the Y-axis directions, a +Y direction, which is the direction in which the arrow points, is the leftward direction and a −Y direction is the rightward direction as viewed by a user facing the front surface of the apparatus.

A Z-axis direction is an apparatus height direction of the recording system 1 and is the vertical direction, and a +Z direction, which is the direction in which the arrow points, is a vertical upward direction and a −Z direction is a vertical downward direction. In the following description, the +Z direction may be simply referred to as above and the −Z direction may be simply referred to as a below.

As shown in FIG. 1, a recording system 1 includes a recording device 10 and a post processing device 30. The recording device 10 according to the present embodiment is an inkjet printer that performs recording by ejecting ink, which is an example of liquid, onto a medium, which is represented by a recording sheet of paper, and includes a line head 18, which is an example of a recording section. The recording device 10 is a so-called multifunction device having a scanner unit 12 in an upper portion of the apparatus.

The recording device 10 is provided with a main body section 14, a medium accommodation section 16 for accommodating the medium, a medium transport section (not shown) for transporting the medium, a line head 18 for performing recording on the medium, an internal discharging section 22 for discharging the medium, a relay unit 24 for transporting the medium to a post processing device 30, and a control section 20 for controlling the recording device 10 and the post processing device 30. A transport path TA through which the medium is transported is provided in the main body section 14.

In this embodiment, the control section 20 is provided in the recording device 10, but may be provided in the post processing device 30.

The line head 18 has a plurality of ink ejection nozzles (not shown) arranged corresponding to the entire area of the medium in the X-axis direction. The line head 18 performs recording on the medium by ejecting ink supplied from an ink tank (not shown) from a plurality of ink ejection nozzles toward the medium. The control section 20 includes a CPU (not shown) and a storage section **20*a*. The storage section 20*a* is formed of a storage medium such as a nonvolatile memory. In the storage section 20*a* are stored various programs and parameters for controlling the recording device 10 and the post processing device 30, and the programs include a program for controlling a blowing section 62**, to be described later.

The medium recorded by the recording device 10 is sent to the post processing device 30 via the relay unit 24. The post processing device 30 includes a device main body 32, a processing tray 42 provided inside the device main body 32, a stapler 34, which is an example of a post processing section, and a main tray 33 provided outside the device main body 32.

Medium delivered from the relay unit 24 to the device main body 32 is transported along a transport path TB inside the device main body 32 and sent to the processing tray 42.

Figure 2:
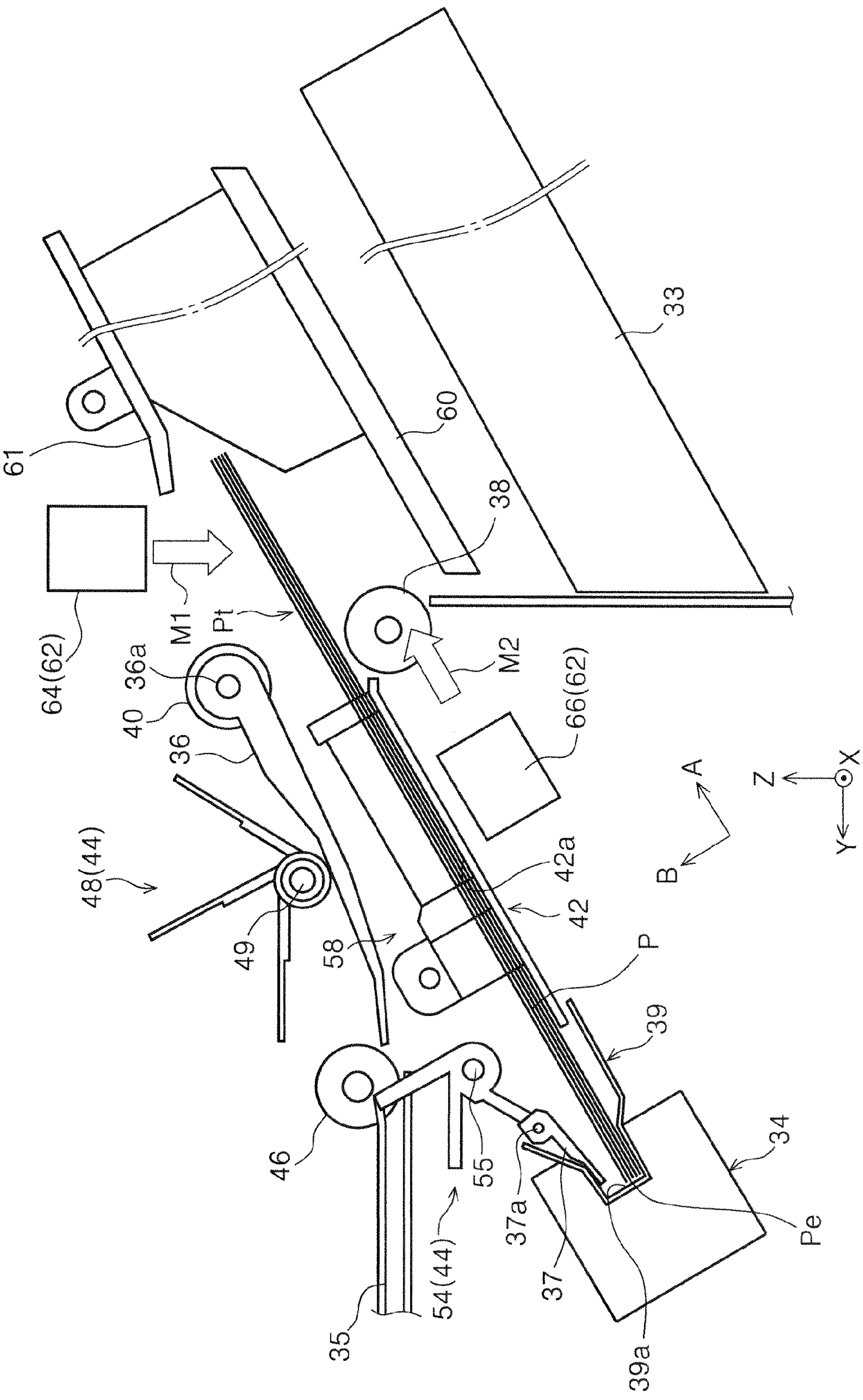
FIG. 2 is a diagram showing internal configuration of a post processing device.

Hereinafter, the configuration of the post processing device 30 will be further described with reference to FIG. 2. Hereinafter, the medium will be appended with the reference symbol P and will be referred to as medium P. A bundle of medium consisting of a plurality of sheets of medium P will be appended with reference symbol Pt and will be referred to as a medium bundle Pt.

A direction along the support surface **42*a* of the processing tray 42 is defined as an A-axis direction, and a +A direction amongst the A-axis directions is defined as a direction in which the medium P is fed to the processing tray 42. Further, a −A direction is a direction in which the medium P on the processing tray 42 is pulled back toward a rear end alignment section 39**. In the present embodiment, the A-axis direction is a direction that includes a +Z direction component and a −Y direction component. A direction that is perpendicular to the A-axis direction as viewed from the X-axis direction is defined as a B-axis direction.

A guide member 35 constitutes a part of the transport path TB and extends toward the processing tray 42. The medium P conveyed along the guide member 35 in the −Y direction is fed toward the processing tray 42 by a transport roller 46 driven by a motor (not shown). Although a medium transport direction by the transport roller 46 is generally the −Y direction, the +A direction is defined as a feed direction of the medium P to the processing tray 42 in this embodiment because medium P that dropped onto the processing tray 42 moves over the support surface 42*a* of the processing tray 42 in the +A direction under the transporting force applied by the transport roller 46.

The medium P sent to the processing tray 42 is pulled by the pullback section 44 in the −A direction back toward the rear end alignment section 39. The pullback section 44 includes a first paddle 48 and a second paddle 54.

The first paddle 48 is made of an elastic material such as rubber, and is rotatable about a rotation shaft 49, which extends in the X-axis direction. The first paddle 48 is driven in the clockwise direction of FIG. 2 by a motor (not shown), thereby applying a feeding force in the −A direction to the medium P that was fed to the processing tray 42.

Similarly to the first paddle 48, the second paddle 54 is made of an elastic material such as rubber, and is provided so as to be rotatable about a rotation shaft 55, which extends in the X-axis direction. The second paddle 54 is driven in the clockwise direction of FIG. 2 by a motor (not shown), thereby applying a feeding force in the −A direction to the medium P that was fed to the processing tray 42.

The rear end alignment section 39 is provided in the −A direction with respect to the processing tray 42. The rear end alignment section 39 has an alignment surface 39*a* parallel to the B-axis direction, and a rear end Pe of the medium bundle Pt on the processing tray 42 abuts against the alignment surface 39*a*, whereby the rear end Pe of the medium bundle Pt is aligned.

A side cursor 58 is provided so as to be movable in the X-axis direction by a driving source (not shown), and is brought into abutment with an X-axis direction end portion of the medium bundle Pt supported by the processing tray 42, thereby aligning the end portion. Note that two side cursors 58 are arranged along the X-axis direction with an interval opened between them, and the two side cursors 58 are provided so as to approach or separate from each other. FIG. 2 shows the side cursor 58 of the two side cursors 58 that is provided in the −X direction.

A flap 37 is arranged with the rear end alignment section 39 along the X-axis direction and is provided so as to be swingable about a shaft section 37*a*, which extends in the X-axis direction. The flap 37 presses the medium bundle Pt on the processing tray 42 downward in the vicinity of the rear end alignment section 39.

A pressing member 36 is provided so as to be swingable about a shaft section 36*a*, which extends in the X-axis direction. The pressing member 36 is provided rotatable by a motor (not shown), and rotates to tap the medium P that was fed toward the processing tray 42 by the transport roller 46, down toward the processing tray 42. By this, the −A direction end portion of the medium P fed toward the processing tray 42 is properly guided to the rear end alignment section 39.

A discharge roller 38 driven by a motor (not shown) is provided in the +A direction with respect to the processing tray 42. A discharge driven roller 40 is provided above the discharge roller 38 so as to be movable toward and away from the discharge roller 38. The discharge driven roller 40 is separated from the discharge roller 38 except when the medium bundle Pt is discharged from the processing tray 42, and when the medium bundle Pt is discharged from the processing tray 42, the discharge driven roller 40 advances toward the discharge roller 38 by a power source (not shown) and nips the medium bundle Pt between itself and the discharge roller 38.

The discharge roller 38 feeds the medium bundle Pt, which is supported by the processing tray 42 and bound by the stapler 34, toward a support tray 60. Although the post processing in the present embodiment is the binding processing by the stapler 34, the post processing is not limited to this, and may be a punching processing for punching a punch hole in the medium bundle Pt, a saddle stitching processing for saddle-stitching the medium bundle Pt, or a shift discharge processing for discharging medium bundles Pt while shifting the ejection position of the medium bundles Pt alternately in the medium width direction. Alternatively, the medium bundle Pt may be discharged without post processing, and the medium bundle Pt may be stacked on the main tray 33 in a so-called pile stacking manner.

Although not shown in the drawings, two support trays 60 are provided with an interval therebetween in the X-axis direction, that is, in the medium width direction, and are provided so as to be movable toward each other or away from each other by the power of a drive source (not shown). The two support trays 60 open up by moving in a direction away from each other and become closed by moving in a direction of approaching each other. Of the two support trays 60, which are provided with an interval therebetween in the medium width direction, FIG. 2 shows the support tray 60 provided in the −X direction.

The medium bundle Pt discharged by the discharge roller 38 is temporarily supported by the closed support trays 60. When the support trays 60 open up, the medium bundle Pt supported by the support trays 60 falls onto the main tray 33. By providing such support trays 60, it is possible to improve the alignment of the medium bundle Pt on the main tray 33. Needless to say, the medium bundle Pt may be directly discharged from the processing tray 42 toward the main tray 33 without providing the support tray 60.

Reference numeral 61 denotes an upper wall section disposed opposite to the support tray 60.

The main tray 33 is displaced by a motor (not shown) in the Z-axis direction, that is, in a stacking direction.

Next, the post processing device 30 is provided with a blowing section 62. The blowing section 62 is composed of a first blowing section 64 and a second blowing section 66.

The first blowing section 64 is provided above the processing tray 42 in the vertical direction. The first blowing section 64 is located at a position shifted from the processing tray 42 in the +A direction in the A-axis direction, and blows air vertically downward as indicated by an arrow M1. Although the details will be described later, in this embodiment, the medium P includes a first region R1 supported by the processing tray 42 and a second region R2 not supported by the processing tray 42 (see FIG. 3A and FIG. 3B), and the first blowing section 64 according to this embodiment blows air toward the second region R2 of the medium P. However, it may be a configuration that blows air to the first region R1 or to both the first region R1 and the second region R2.

Figure 8:
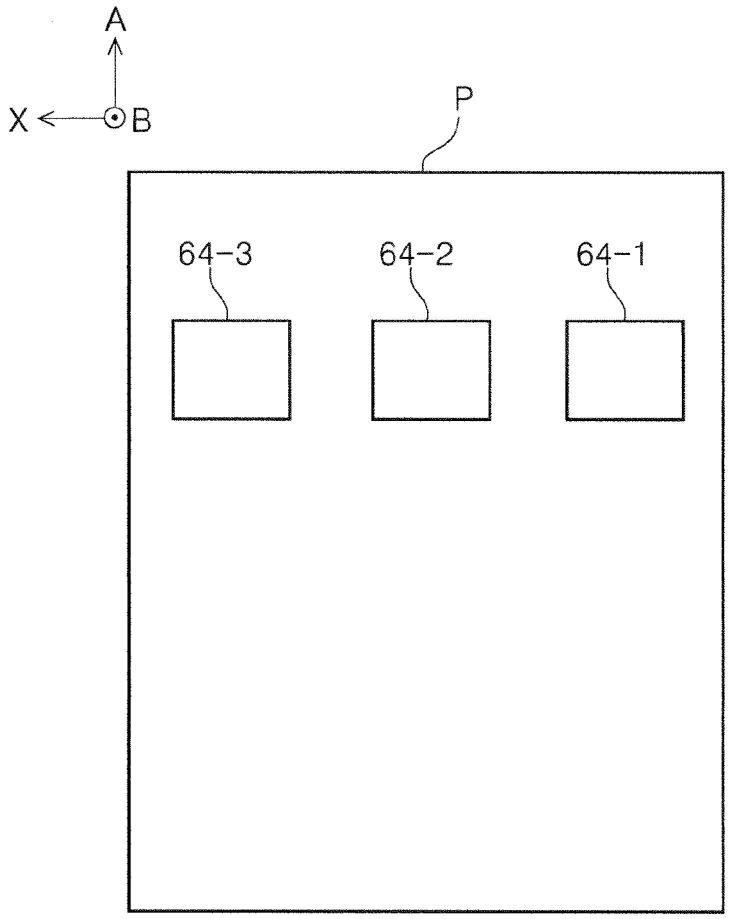
FIG. 8 is a plan view showing arrangement of first blowing sections in a medium width direction.

The first blowing section 64 is configured so that the blowing amount can be adjusted under the control of the control section 20. The minimum blowing amount is zero (without blowing air). In this embodiment, as indicated by reference numerals 64-1, 64-2, and 64-3 in FIG. 8, a plurality (three in this embodiment) of first blowing sections 64 is provided along the medium width direction. Since a plurality of the first blowing sections 64 is provided in the medium width direction in this manner, the effects of blowing by the first blowing section 64 can be more reliably obtained.

The second blowing section 66 is provided below the processing tray 42. The second blowing section 66 blows air in the +A direction as indicated by an arrow M2. The second blowing section 66 is configured to be capable of adjusting the blowing amount under the control of the control section 20. The minimum blowing amount is zero (without blowing air). Although not shown, as with the first blowing section 64, a plurality (three in this embodiment) of second blowing sections 66 is provided along the medium width direction. Since a plurality of the second blowing sections 66 is provided in the medium width direction in this manner, the effects of blowing by the second blowing section 66 can be more reliably obtained.

The blowing section 62 may be configured by both the first blowing section 64 and the second blowing section 66, or may be configured by only one of them. The effects and adverse effects of blowing air by the first blowing section 64 will be described below with reference to FIG. 3A and FIG. 3B, and the effects and adverse effects of blowing air by the second blowing section 66 will be described below with reference to FIG. 4A and FIG. 4B.

Figure 3A:
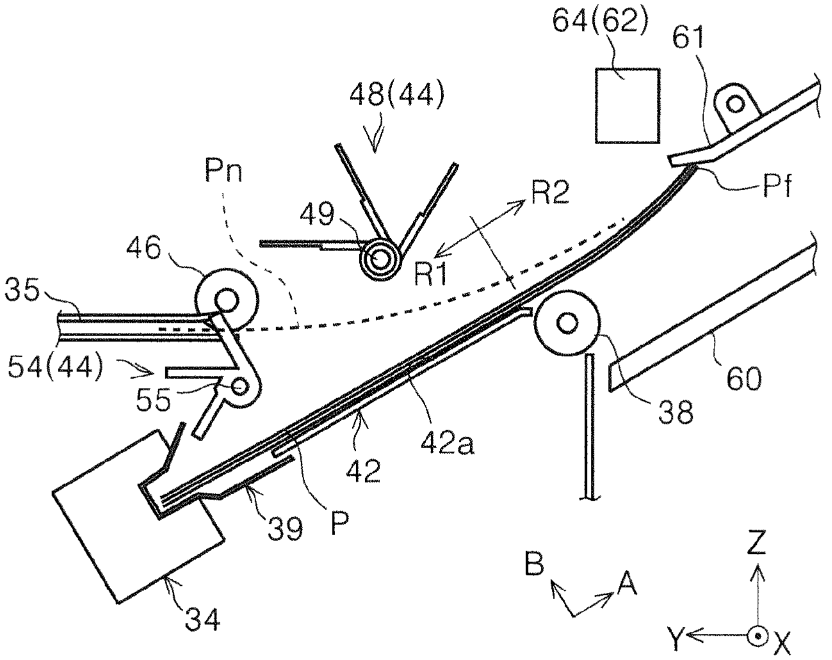
FIGS. 3A and 3B are diagrams for explaining adverse effects in a configuration in which air is blown from above to a processing tray.
Figure 3B:
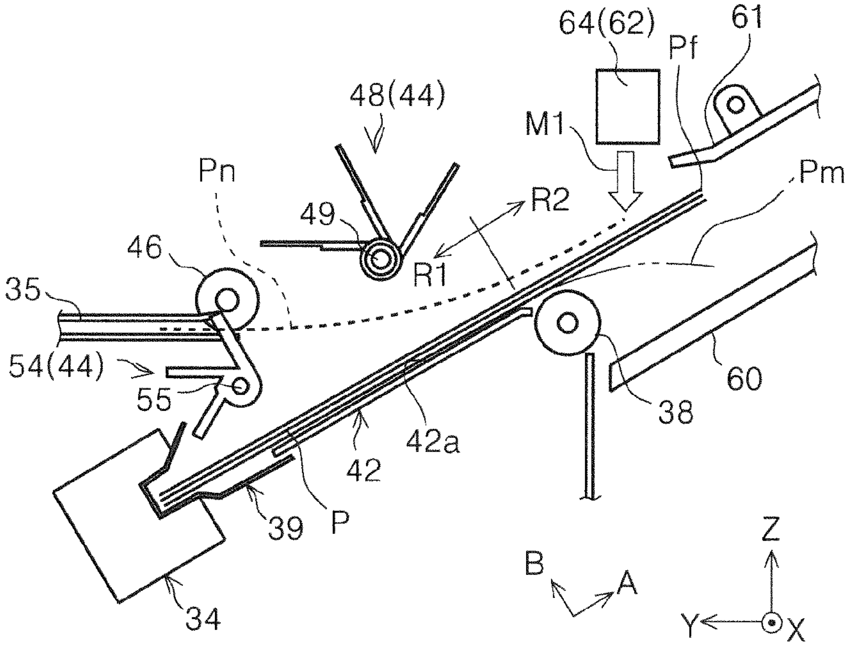

FIG. 3A shows that the +A direction leading end Pf of the medium P supported by the processing tray 42 curls upward and is in contact with the upper wall section 61 constituting the support tray 60. In FIG. 3A and FIG. 3B and subsequent drawings, a part of the configuration shown in FIG. 2 is omitted for simplification of illustration.

As shown in FIG. 3A, since the leading end Pf of the medium P curls upward, there is no gap for a medium Pn that is subsequently fed to the processing tray 42 to enter through the lower side of the upper wall section 61, so that there is a possibility that a jam occurs, or that when the medium P is pulled back in the −A direction by the pullback section 44, a transportation load increases and alignment failure occurs.

In order to suppress curling of the medium P upward as described above, air is blown downward from the first blowing section 64 as shown in FIG. 3B. As a result, the upward curl of the medium P is suppressed, and jams and alignment failures caused by the upward curl can be suppressed.

However, if the number of medium P stacked on the processing tray 42 is small, then, as indicated by the reference symbol Pm in FIG. 3B, the medium P may buckle downward by the air blown by the first blowing section 64, or in particular, if there is only one sheet of the medium P, there is a possibility that the medium P may be largely moved by the blowing air because clinging force between sheets of medium is not obtained. This is an adverse effect caused by blowing by the first blowing section 64.

The medium P includes a first region R1 supported by the processing tray 42 and a second region R2 not supported by the processing tray 42, and buckling occurs in the second region R2.

Figure 4A:
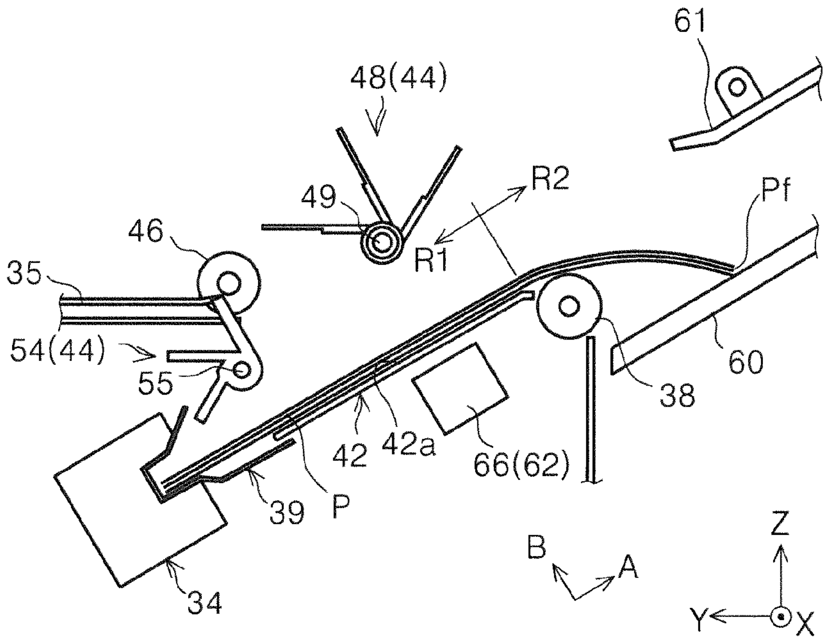
FIGS. 4A and 4B are diagrams for explaining adverse effects in a configuration in which air is blown from below to the processing tray.

FIG. 4A shows that the +A direction leading end Pf of the medium P supported by the processing tray 42 curls downward and is in contact with the support tray 60. Such a downward curl of the medium P occurs in the second region R2.

Figure 4B:
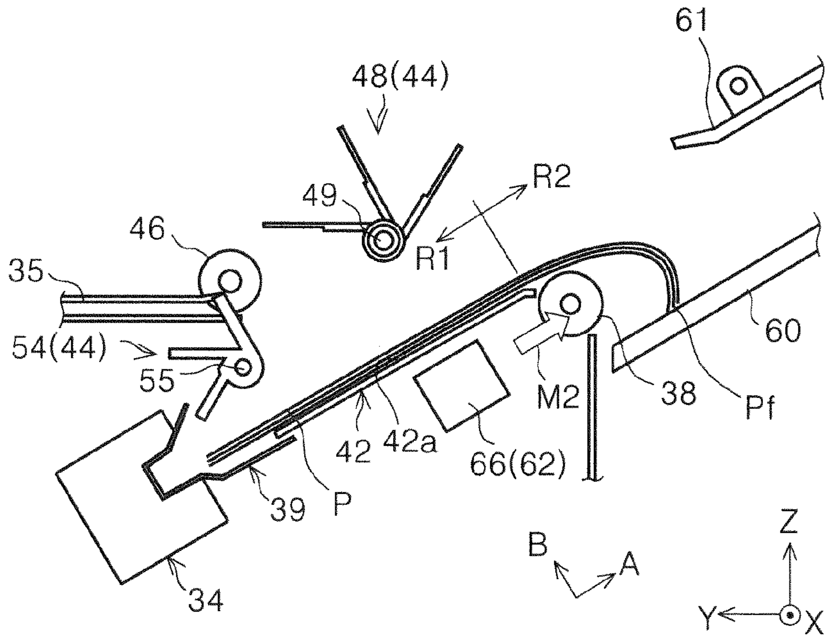

When the medium bundle Pt on which post processing was performed receives a feeding force in the +A direction from the discharge roller 38 while in this state, then as shown in FIG. 4B, the leading end Pf bends without moving in the +A direction, due to friction between the leading end Pf and the support tray 60, and so the medium bundle Pt may not be appropriately discharged to the support tray 60.

In order to suppress such a discharge failure, as shown in FIG. 4B, air is blown from the second blowing section 66 in the direction of arrow M2. As a result, the curling of the medium P in the downward direction is suppressed, and the medium bundle Pt can be appropriately discharged to the support tray 60.

However, in a state in which the first sheet of medium P was fed to the processing tray 42, because the second blowing section 66 applies a +A direction force to the second region of the medium P, this becomes a load on the −A direction pullback of the medium P by the pullback section 44, and there is a possibility that alignment failure may occur. Further, when only one sheet of medium P is fed, since the medium P does not receive a load from above, there is a possibility that the stacking position will be largely moved by air blowing. This is an adverse effect caused by blowing by the second blowing section 66.

Figure 5:
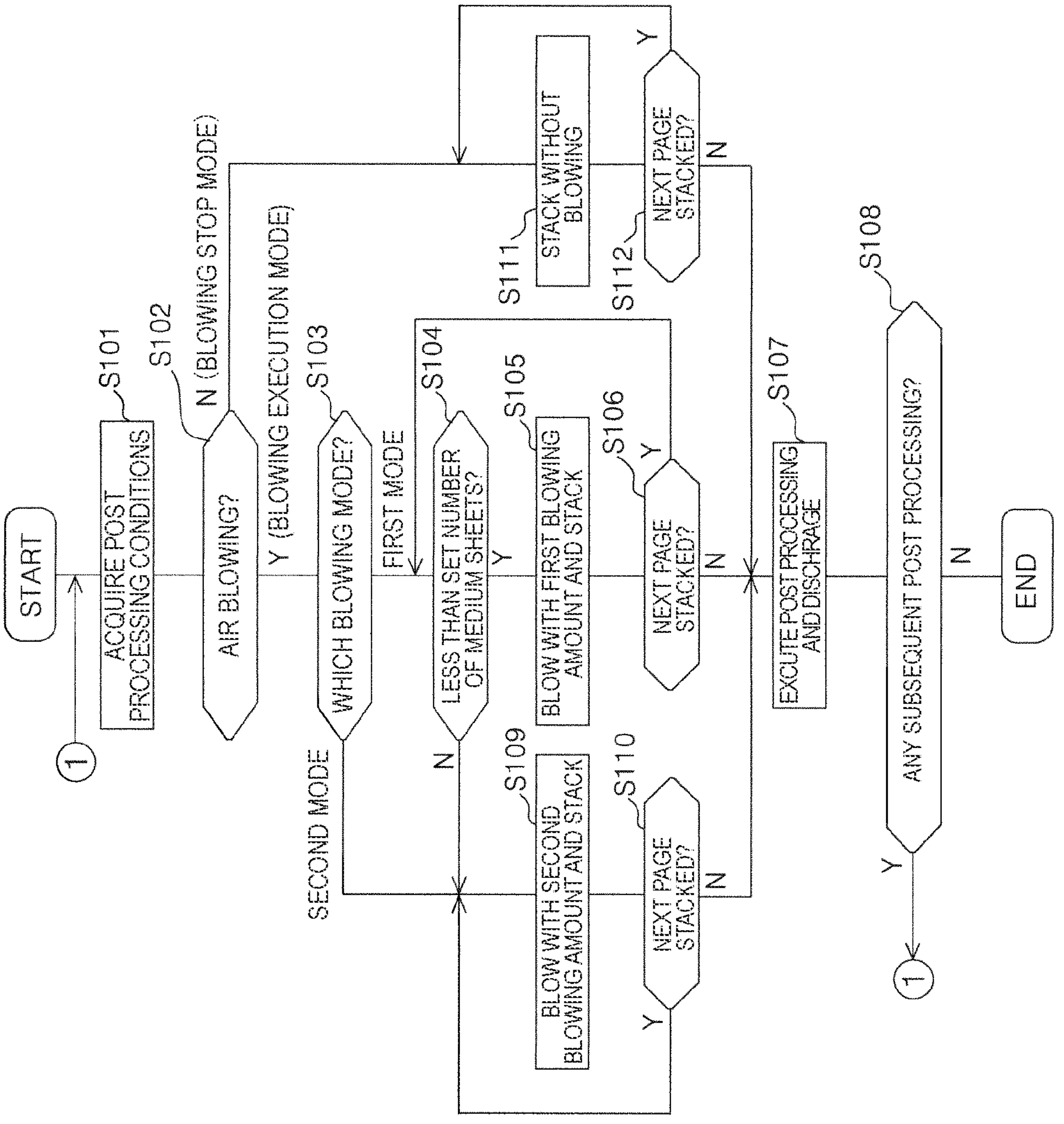
FIG. 5 is a flowchart showing flow of a control performed by a control section.

The control section 20 performs the control shown in FIG. 5 in order to suppress such adverse effects caused by blowing. In the following description, it is assumed that air is blown from the first blowing section 64. In other words, it is assumed that the second blowing section 66 is not used.

When post processing is performed, the control section 20 acquires post processing conditions (step S101). In this embodiment, the post processing conditions include the following:

Condition (1): Whether or not air is blown.

Condition (2): When air is blown, whether a first mode or a second mode is selected.

Condition (3): In the first mode, the set number of sheets.

Condition (4): Type of medium (plain paper, special paper, and the like).

Condition (5): Size, orientation, and grain direction of the medium.

Condition (6): Recording information (recording density, recording area, and the like).

Condition (7): Environmental information (temperature and humidity).

Condition (8): Content of post processing (binding position, number of binding positions, and the like).

The conditions (1) and (2) may be acquired based on information set by a user through an operation panel (not shown) of the recording device 10 or a printer driver operating in a computer (not shown) that transmits recording data to the recording device 10, or the control section 20 may determine the conditions based on at least one of the conditions (4), (5), (6), and (7).

Condition (3) is information that is acquired only when a blowing execution mode, to be described later, is selected and the first mode is selected and that is stored in a nonvolatile memory (not shown) provided in the control section 20.

The conditions (4), (5) and (8) can be acquired based on information set by a user through an operation panel (not shown) of the recording device 10 or through a printer driver operating in a computer (not shown) that transmits recording data to the recording device 10.

Condition (6) can be acquired based on print data received by the recording device 10.

Condition (7) can be acquired from a temperature/humidity sensor (not shown). The temperature/humidity sensor may be provided in either the recording device 10 or the post processing device 30.

The above conditions (1) to (8) are examples, and it is not necessary to acquire all of the conditions (1) to (7) except for condition (8). For example, when condition (1) is not acquired, the blowing execution mode, to be described later, may be automatically selected, and when condition (2) is not acquired, the first mode, to be described later, may be automatically selected.

The conditions (4), (5), (6) and (7) can be used by the control section 20 to determine the ease of curling in the second region R2 (the region where the medium P is not supported by the processing tray 42).

For example, with respect to condition (4), the lower the rigidity of the medium, the more likely that curling will occur and, for example, plain paper is more likely to curl than special paper. For example, with respect to condition (5), the longer the medium length (length in the A-axis direction) of the second region R2, the more likely curling will occur, and when the grain direction of the medium P is along the X-axis direction, the more likely that curling will occur. Here, when the paper fibers are along a predetermined direction, the grain direction of the medium P is the predetermined direction. For example, regarding condition (6), the higher the recording density is, the more likely that curling will occur, and the larger the recording area in the second region R2 is, the more likely that curling will occur. For example, with respect to condition (7), the higher the temperature and humidity, the more likely that curling will occur.

The likelihood of curling of the medium P affects the selection of the blowing execution mode, to be described later, and affects the selection of a first mode, to be described later.

Next, the control section 20 determines whether or not the post processing includes air blowing (step S102, condition (1)). When air blowing is not included (No in step S102), that is, when in the blowing stop mode, the medium P is stacked on the processing tray 42 without air blowing (step S111), and when stacking is completed, that is, when there is no stacking of a subsequent page (step S112), post processing is executed and the medium bundle Pt is discharged (step S107). If there is a subsequent post processing (Yes in step S108), then the process returns to step S101. When post processing is consecutively performed under the same conditions, then steps S101 and S102 may be omitted.

When the post processing includes air blowing (Yes in step S102), that is, when in the blowing execution mode, then the control section 20 determines whether the blowing mode is to be performed in the first mode or in the second mode (step S103, condition (2)). The first mode is a mode in which the blowing amount changes according to the number of sheets of medium on the processing tray 42, and the second mode is a mode in which the blowing amount is constant regardless of the number of sheets of medium on the processing tray 42. The values of the blowing amount for the first mode and for the second mode are stored in a nonvolatile memory (not shown) provided in the control section 20.

In the case of the first mode, the control section 20 determines whether or not the number of sheets of medium P on the processing tray 42 is less than the set number of sheets (step S104). This set number of sheets is the condition (3) acquired in step S101. When the number of sheets of medium P on the processing tray 42 is less than the set number of sheets (Yes in step S104), the medium P is stacked on the processing tray 42 while air is blown in the first blowing amount (step S105). The first blowing amount is smaller than a second blowing amount, to be described later, and includes zero (without blowing air).

When the stacking of the medium P is completed in the state of less than the set number of sheets, that is, when there is no stacking of a subsequent page (No in step S106), the post processing is executed and the medium bundle Pt is discharged (step S107). If there is a subsequent post processing (Yes in step S108), then the process returns to step S101. When the post processing is consecutively performed under the same conditions, the steps S101, S102, S103 may be omitted.

When the second mode was selected in step S103 or when the set number of sheets is exceeded in step S104, then the control section 20 stacks the medium P onto the processing tray 42 while blowing air at the second blowing amount (step S109). The second blowing amount is larger than the first blowing amount described above. When stacking of the medium P is completed, that is, when there is no stacking of a subsequent page (No in step S110), the post processing is executed and the medium bundle Pt is discharged (step S107). If there is a subsequent post processing (Yes in step S108), then the process returns to step S101. When the post processing is consecutively performed under the same conditions, the steps S101, S102, S103 may be omitted.

The control described above is performed when the first blowing section 64, which is located above the processing tray 42, is used, but the same is performed when only the second blowing section 66 is used or when the second blowing section 66 is used in addition to the first blowing section 64.

Note that when only the second blowing section 66 is used, it is suitable to set the “set number of sheets” to “2” because the adverse effect caused by blowing air using the second blowing section 66 described with reference to FIG. 4B occurs only when the first sheet of medium P is stacked on the processing tray 42.

When the second blowing section 66 is further used in addition to the first blowing section 64, then a different value for the above-described “set number of sheets” may be applied to the first blowing section 64 than the value applied to the second blowing section 66. For example, the set number of sheets applied for the first blowing section 64 may be three or more, and the predetermined set number of sheets applied for the second blowing section 66 may be two.

When the second blowing section 66 is further used in addition to the first blowing section 64, the adverse effect caused by blowing air by the first blowing section 64 described with reference to FIG. 3B is unlikely to be caused by blowing air by the second blowing section 66, but alignment is likely to be disturbed by blowing air when the number of stacked sheets of medium is small, so it is preferable to set to the first blowing amount when the number of stacked sheets of medium is smaller than the set number of sheets.

As described above, the post processing device 30 is a device for performing post processing on the medium P recorded by the recording device 10, and includes the processing tray 42 for supporting the medium P on which is to be performed post processing, the stapler 34 for performing post processing on the medium P supported by the processing tray 42, and the blowing section 62 capable of blowing air at the medium P supported by the processing tray 42.

When the number of sheets of medium P supported by the processing tray 42 is less than the predetermined set number of sheets, then the control section 20 for controlling the blowing section 62 sets the blowing amount by the blowing section 62 to the first blowing amount, and when the number of sheets of medium P supported by the processing tray 42 is equal to or greater than the set number of sheets, then the control section 20 sets the blowing amount by the blowing section 62 to the second blowing amount, which is larger than the first blowing amount.

As a result, it is possible to suppress adverse effects caused by blowing air by the first blowing section 64 (for example, buckling of the medium P) or adverse effects caused by blowing air by the second blowing section 66 (for example, alignment failure caused by transportation load).

When the number of sheets of medium P supported by the processing tray 42 is equal to or larger than the set number of sheets, an operation effect of air blowing by the blowing section 62 is obtained.

In the above-described embodiment, the first blowing amount is constant and the second blowing amount is also constant, but one or both of them may be changed depending on the number of stacked sheets of medium P. For example, the first blowing amount or the second blowing amount may be increased in accordance with increase in the number of stacked sheets of medium P. In this case, the blowing amount may be continuously increased or may be increased in steps.

The medium P supported by the processing tray 42 has the first region R1 supported by the processing tray 42 and the second region R2 not supported by the processing tray 42, and the blowing section 62 blows air toward the second region R2. With such a configuration, adverse effects caused by blowing air by the first blowing section 64 (for example, buckling of the medium P) or adverse effects caused by blowing by the second blowing section 66 (for example, alignment failure caused by transportation load) are likely to occur, but when the number of media P supported by the processing tray 42 is less than a predetermined set number of sheets as described above, the blowing amount by the blowing section 62 is set to the first blowing amount, so that adverse effects caused by blowing air can be suppressed.

In addition, when the first blowing amount is zero, adverse effects caused by blowing can be reliably suppressed.

Figure 6A:
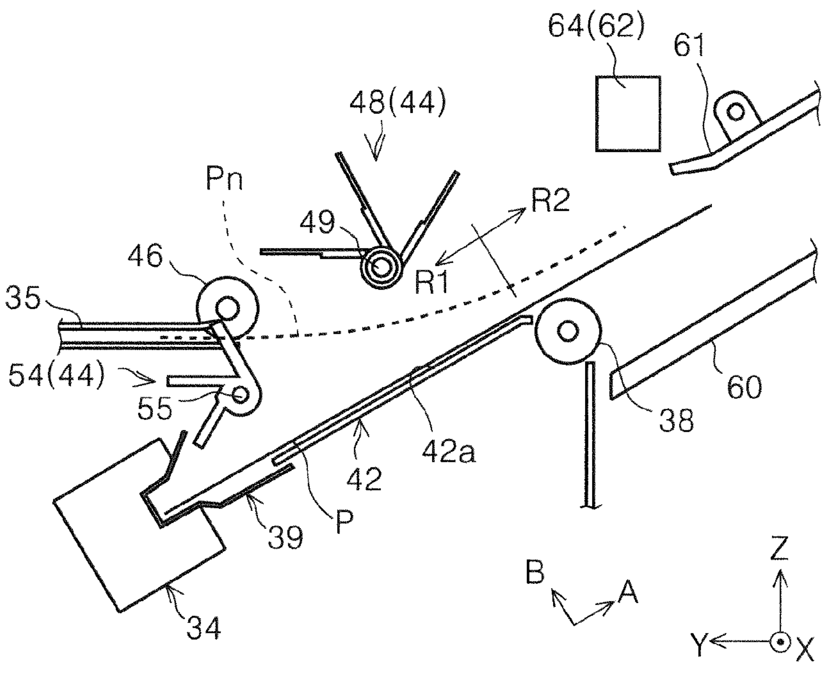
FIGS. 6A and 6B are diagrams for explaining control in a configuration in which air is blown from above the processing tray.
Figure 6B:
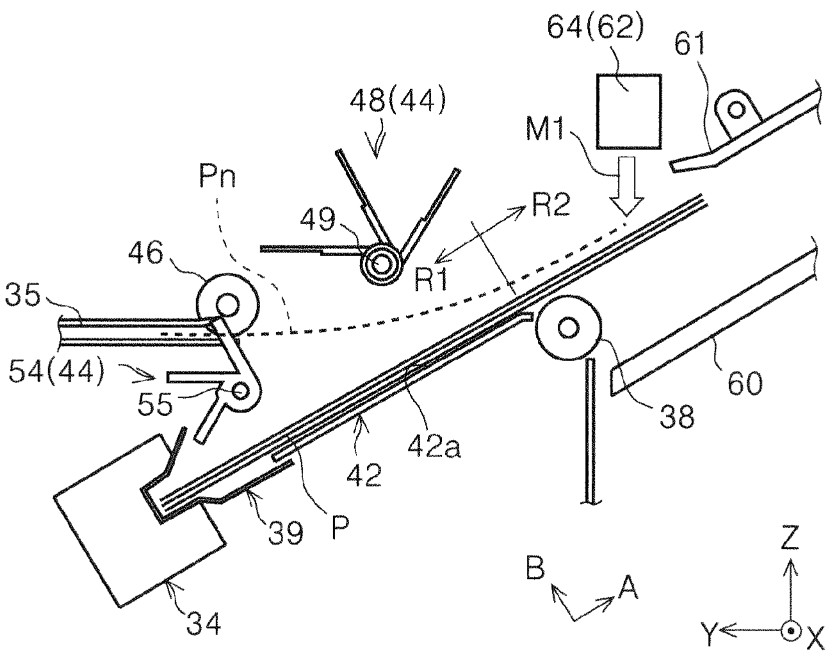

Further, as shown in FIG. 6, the first blowing section 64 blows air from above to the medium P supported by the processing tray 42, and further, in the present embodiment, the blowing section 62 blows air from above in the vertically downward direction at the medium P supported by the processing tray 42.

Accordingly, the upward curl of the medium P supported by the processing tray 42 can be effectively suppressed.

In the present embodiment, the first blowing section 64 blows air from above to vertically downward with respect to the medium P supported by the processing tray 42, but may blow air in a direction including a −Y direction component or a +Y direction component, for example.

Figure 7A:
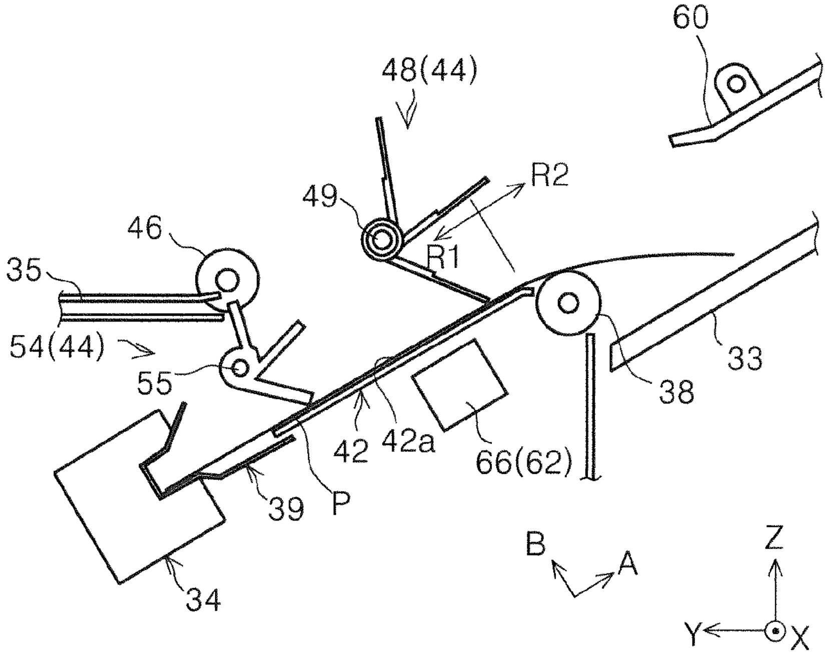
FIGS. 7A and 7B are diagrams for explaining control in a configuration in which air is blown from below to the processing tray.
Figure 7B:
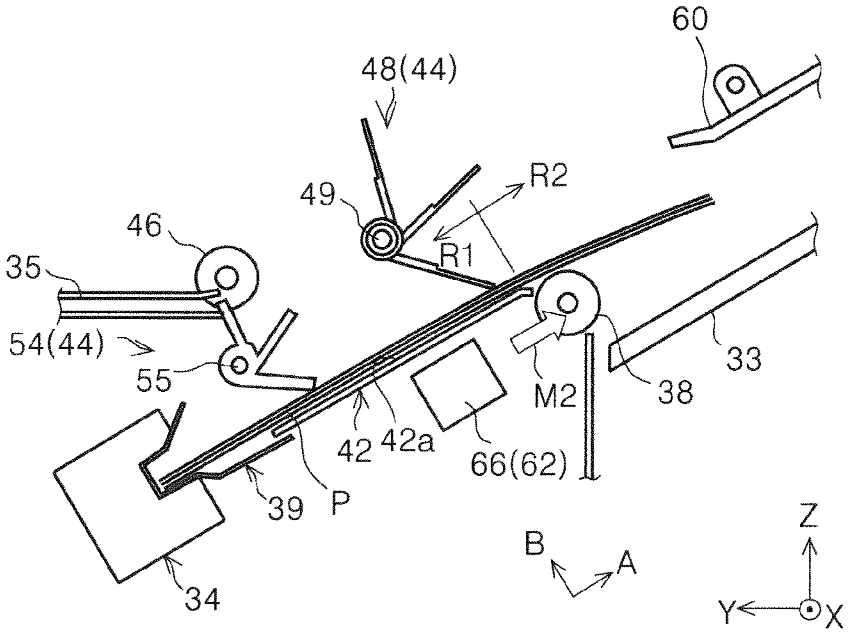

As shown in FIGS. 7A and 7B, the second blowing section 66 blows air from below the processing tray 42 to the second region R2 of the medium P supported by the processing tray 42. Since the second region R2 of the medium P is not supported by the processing tray 42, the second region R2 of the medium P tends to curl downward. However, since the second blowing section 66 blows air from below the processing tray 42 at the second region R2 of the medium P supported by the processing tray 42, it is possible to suppress curling of the medium P in the downward direction.

The blowing section 62 is provided with a plurality of blowing sections, and the plurality of blowing sections include the first blowing section 64, which blows air from above the medium P supported by the processing tray 42, and the second blowing section 66, which blows air from below the processing tray 42 at the second region R2 of the medium P supported by the processing tray 42. As a result, both upward curl and downward curl of the medium P can be suppressed.

The device is also provided with the transport roller 46, which is an example of a transport section for feeding the medium P to the processing tray 42, the pullback section 44 for pulling the medium P that was fed to the processing tray 42 by the transport roller 46, back in the direction opposite to the feed direction of the medium P to the processing tray 42, and the rear end alignment section 39 for aligning the rear end of the medium P pulled back by the pullback section 44, wherein the blowing direction by the second blowing section 66 includes a component along the +A direction, which is the feed direction. As a result, the downward curl of the medium P can be suppressed.

Further, the control section 20 can select between the first mode, in which air is blown at the medium P by the first blowing amount or the second blowing amount based on the number of sheets of medium P supported by the processing tray 42, and the second mode, in which the blowing amount by the blowing section 62 is not changed regardless of the number of medium P supported by the processing tray 42. As a result, by selecting the first mode, it is possible to suppress the above-described adverse effects caused by blowing of the first blowing section 64 (for example, buckling of the medium P) or the adverse effects caused by blowing of the second blowing section 66 (for example, alignment failure caused by the transportation load), and by selecting the second mode, it is possible to give priority to the effect caused by blowing air.

The control section 20 can select between the first mode and the second mode based on the medium information. In this embodiment, the medium information is the above-described conditions (4) and (5). This makes it possible to perform appropriate post processing based on the type of medium.

Specifically, it is preferable to judge the tendency of the medium P to curl based on the medium information as described above, and to select the first mode when the medium will curl easily.

More specifically, for example, based on condition (4), the first mode can be selected in the case of plain paper, and the second mode can be selected in the case of special paper.

Alternatively, based on condition (5), the first mode can be selected when the grain direction of the medium P is in the X-axis direction, and the second mode can be selected when the grain direction of the medium P is in a direction other than the X-axis direction.

Based on condition (6), the first mode may be selected when the recording density is equal to or greater than a predetermined density, or the second mode may be selected when the recording density is less than a predetermined density. As an example, the recording density can be obtained by a ratio between the number of dots formed by ink per unit area and the maximum number of dots that can be formed per unit area.

Based on condition (7), the first mode can be selected when the temperature is equal to or higher than a predetermined temperature and also the humidity is equal to or higher than a predetermined humidity, and the second mode can be selected in other cases.

A plurality of conditions (4), (5), (6), and (7) may be used, and selection of the first mode or the second mode may be comprehensively determined by using weighting.

Further, the control section 20 can select between the blowing execution mode, in which air is blown to the medium P by a first blowing amount or by a second blowing amount based on the number of sheets of medium P supported by the processing tray 42, and a blowing stop mode, in which air is not blown by the blowing section 62 regardless of the number of sheets of medium P supported by the processing tray 42. By selecting the blowing execution mode, the effects of blowing can be obtained, and by selecting the blowing stop mode, it is possible to give priority to suppression of power consumption and to suppression of adverse effects caused by blowing, rather than to the effects of blowing.

Further, the control section 20 may select the blowing execution mode or the blowing stop mode based on the medium information. In this embodiment, the medium information is the above-described conditions (4) and (5). By this, an appropriate post processing can be performed based on the type of medium.

Specifically, as described above, the tendency of the medium P to curl is based on the medium information as described above, and the blowing execution mode is selected in the case of a medium that easily curls. A specific example for determining the tendency to curl is the same as for selection of the first mode and the second mode described above.

The present disclosure is not limited to the embodiments described above, and various modifications are possible within the scope of the disclosure described in the claims, and it goes without saying that such modifications are also included within the scope of the present disclosure.

What is claimed is:

1. A post processing device that performs post processing on a medium recorded on by a recording device, the post processing device comprising:

a processing tray configured to support a medium on which post processing is to be performed;

a post processing section configured to perform post processing on the medium supported by the processing tray; and a blowing section configured to blow air at the medium supported by the processing tray, wherein:

the medium supported by the processing tray has a first region supported by the processing tray and a second region not supported by the processing tray and the blowing section blows air toward the second region of the medium on which the post processing has not been executed by the post processing section; and a control section for controlling the blowing section sets a blowing amount by the blowing section to a first blowing amount when a number of sheets of medium supported by the processing tray is less than a predetermined set number of sheets and sets a blowing amount by the blowing section to a second blowing amount, which is larger than the first blowing amount, when the number of sheets of medium supported by the processing tray is equal to or greater than the set number of sheets.

2. The post processing device according to claim 1, wherein the first blowing amount is zero.

3. The post processing device according to claim 1, wherein the blowing section blows air from above with respect to the medium supported by the processing tray.

4. The post processing device according to claim 3, wherein the blowing section blows air from above to vertically downward with respect to the medium supported by the processing tray.

5. The post processing device according to claim 1, wherein the blowing section blows air from below the processing tray with respect to the second region of the medium supported by the processing tray.

6. The post processing device according to claim 1, wherein a plurality of the blowing sections are provided and the plurality of blowing sections includes a first blowing section that blows air from above with respect to the medium supported by the processing tray and a second blowing section that blows air from below the processing tray with respect to the second region of the medium supported by the processing tray.

7. The post processing device according to claim 1, further comprising:

a transport section for feeding, to the processing tray, the medium on which post processing is to be performed;

a pullback section that pulls the medium that was fed to the processing tray by the transport section, back in a direction opposite to a feed direction of the medium toward the processing tray; and a rear end alignment section that aligns a trailing edge of the medium that was pulled back by the pullback section, wherein a blowing direction of the blowing section includes a component along the feed direction.

8. The post processing device according to claim 1, wherein the control section is configured to select a first mode for blowing air at the medium by the first blowing amount or by the second blowing amount based on a number of sheets of medium supported by the processing tray or a second mode in which the blowing amount by the blowing section does not change regardless of the number of sheets of medium supported by the processing tray.

9. The post processing device according to claim 8, wherein the control section selects the first mode or the second mode based on medium information.

10. The post processing device according to claim 1, wherein the control section is configured to select a blowing execution mode for blowing air at medium by the first blowing amount or the second blowing amount based on a number of sheets of medium supported by the processing tray or a blowing stop mode in which blowing by the blowing section is not executed regardless of the number of sheets of medium supported by the processing tray.

11. The post processing device according to claim 10, wherein the control section selects the blowing execution mode or the blowing stop mode based on medium information.

12. The post processing device according to claim 1, wherein a plurality of the blowing sections are provided in a width direction, which is a direction intersecting a feed direction of the medium to the processing tray.

13. A recording system comprising:

a recording device including a recording section for recording on a medium and the post processing device according to claim 1, the post processing device performing post processing on the medium that was recorded on by the recording device.

14. The recording system according to claim 13, wherein the recording device performs recording on the medium by ejecting liquid.

15. A method for controlling a post processing device, the post processing device including:

a processing tray configured to support a medium on which post processing is to be performed;

a post processing section configured to perform post processing on the medium supported by the processing tray; and a blowing section configured to blow air at the medium supported by the processing tray, wherein the medium supported by the processing tray has a first region supported by the processing tray and a second region not supported by the processing tray, the method comprising:

setting a blowing amount blown by the blowing section to a first blowing amount when a number of sheets of medium supported by the processing tray is less than a predetermined set number of sheets;

setting a blowing amount by the blowing section to a second blowing amount, which is larger than the first blowing amount, when the number of sheets of medium supported by the processing tray is equal to or greater than the set number of sheets; and blowing air toward the second region of the medium on which the post processing has not been executed by the post processing section.

16. The post processing device according to claim 8, wherein the control section selects the first mode or the second mode based upon (i) type of medium or (ii) size, orientation, and grain direction of the medium.

17. The post processing device according to claim 10, wherein the control section selects the blowing execution mode or the blowing stop mode based upon (i) type of medium or (ii) size, orientation, and grain direction of the medium.

18. The post processing device according to claim 1, further comprising:

a support tray configured to support the medium following post processing, wherein the blowing section is configured to blow air in a blowing direction, having a component along a support surface of the processing tray, toward the medium supported by the processing tray and the support tray.

* * * * *